No. 636,237. Patented Nov. 7, 1899.
J. E. BANCROFT.
VULCANIZER.
(Application filed Dec. 17, 1897. Renewed Apr. 7, 1899.)
(No Model.) 2 Sheets—Sheet 1.
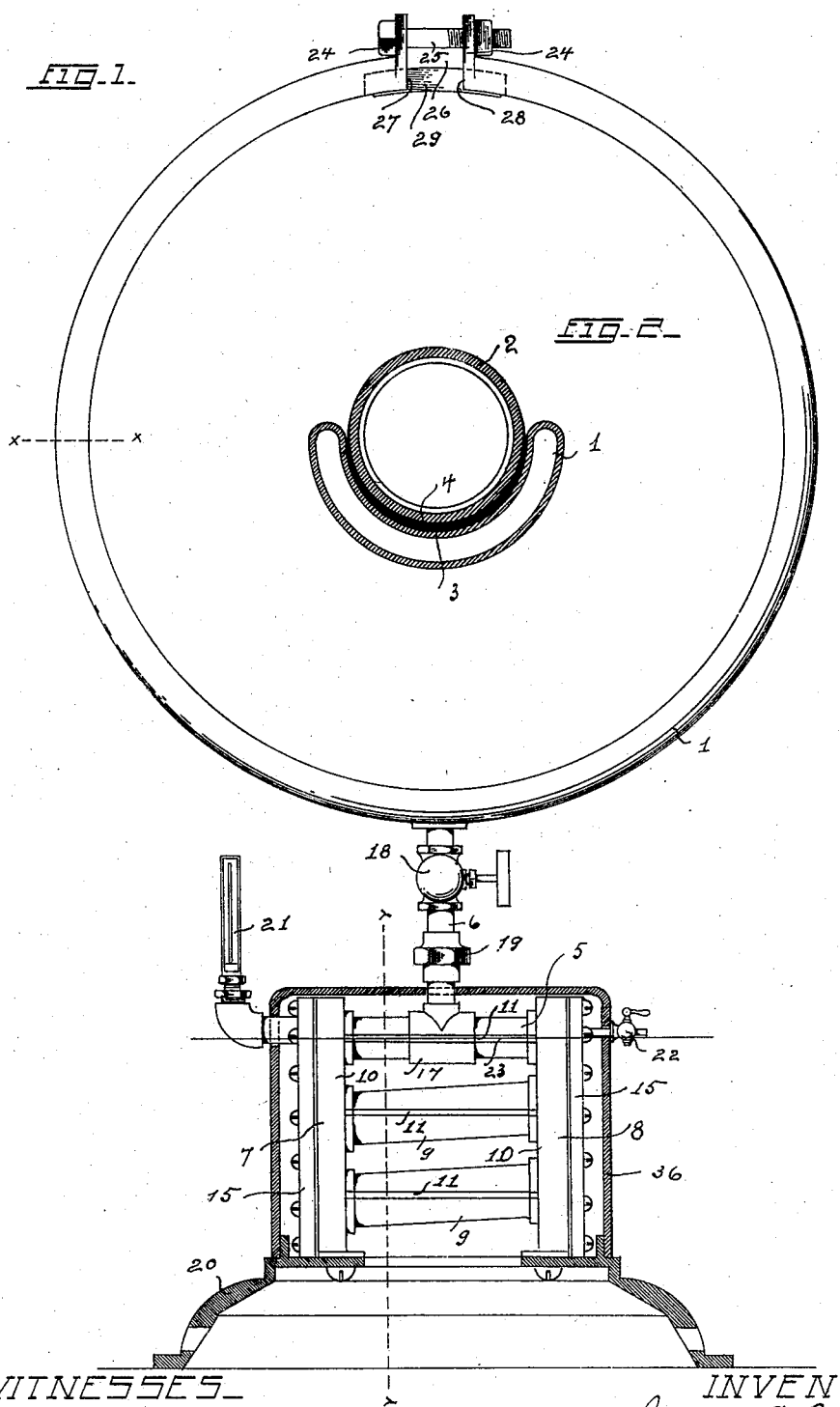
WITNESSES
H. H. Martin
Albert Rosenfeld.
INVENTOR
James E. Bancroft
By William Nebeker
Atty No. 636,237. Patented Nov. 7, 1899.
J. E. BANCROFT.
VULCANIZER.
(Application filed Dec. 17, 1897. Renewed Apr. 7, 1899.)
(No Model.) 2 Sheets—Sheet 2.
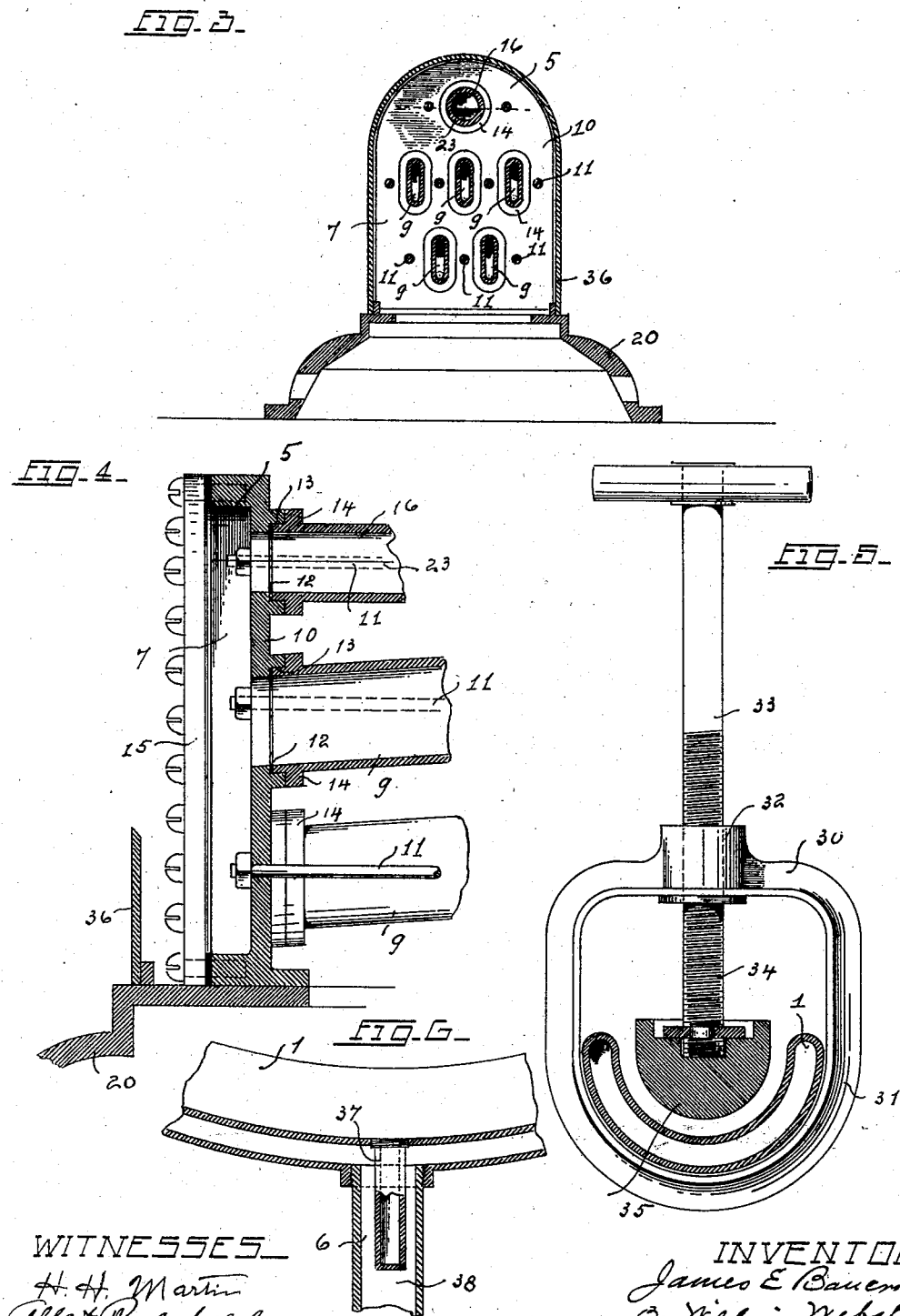
WITNESSES
H. H. Martin
Albert Rosenfeld
INVENTOR
James E. Bancroft
By William Webster
atty

UNITED STATES PATENT OFFICE.

JAMES E. BANCROFT, OF TOLEDO, OHIO, ASSIGNOR TO THE NATIONAL CEMENT AND RUBBER MANUFACTURING COMPANY, OF SAME PLACE.

VULCANIZER.

SPECIFICATION forming part of Letters Patent No. 636,237, dated November 7, 1899.

Application filed December 17, 1897. Renewed April 7, 1899. Serial No. 712,162. (No model.)

*To all whom it may concern:*

Be it known that I, JAMES E. BANCROFT, of Toledo, county of Lucas, and State of Ohio, have invented certain new and useful Improvements in Vulcanizers; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a vulcanizer, and has for its object to provide an apparatus for vulcanizing the traction-surface of a tire when inflated. I accomplish this object by providing a semicircular tubular thermal plate mounted upon a heating apparatus and provide connections between the thermal plate and a steam-generator supported upon a base, into which a caloric agent is introduced, the combustion thereof generating the steam to a temperature to heat a crescent-shaped tube which encircles the inflated tire and vulcanizes the reinforced rubber portion of the traction-surface of the tire.

In the drawings, Figure 1 is an elevation of a vulcanizer constructed in accordance with my invention, showing the base and jacket of the vulcanizer in section. Fig. 2 is a cross-section through the thermal plate on line $x\ x$, Fig. 1, showing the base of the inflated tire. Fig. 3 is a transverse section on line $y\ y$, Fig. 1. Fig. 4 is a longitudinal vertical section through a portion of the steam-generator, and Fig. 5 is a part elevation through the thermal plate having a clamp in engagement therewith for vulcanizing a portion of the tire. Fig. 6 is a section through a socket located in the steam-riser and secured to the thermal plate for vulcanizing a valve-stem to a tire.

In carrying out my invention I provide a semicircular tubular thermal plate 1, adapted to embrace the inflated tire 2 for the purpose of vulcanizing the reinforced material 3, which is applied to the abraded traction-surface 4 of the tire. The thermal plate 1 is supported upon a steam-generator 5 by means of a riser 6. The steam-generator 5 comprises water-legs 7 and 8, having a plurality of transverse inclined water-tubes 9 secured thereto. Tubes 9 are constructed in the form of an elongated ellipsoid, as shown in Fig. 3, and are connected to sections 10 of the water-legs by bolts 11, comprising a gasket 12, interposed between the edge of the tubes, and a pocket 13, formed in the side of the sections 10.

14 designates a projecting ring integral with the tubes 9, and, if preferred, I may weld the tubes to the sections 10. The ends of the water-legs are closed by means of closure-plates 15, which are secured to the sections 10 by bolts or rivets circumferentially spaced in the margin of the sections 10 and the plates 15, a suitable gasket being interposed between the said plates. The steam-dome 16 of the generator 5 is preferably made circular and is provided with a coupling member 17 to secure the riser 6 to the thermal plate 1. The riser 6 is provided with a cut-off valve 18 and a union-coupling 19 for the purpose of easily disconnecting the plate 1 from the generator 5 and substituting thermal plates of smaller arcs than shown in Fig. 1. Generator 5 is supported upon a base 20, into which a caloric agent is introduced to provide the necessary thermal units to operate the vulcanizer.

21 designates a thermometer secured to the generator and is adapted to indicate the temperature and coincident pressure generated.

22 designates a try-cock communicating with the interior of the generator 5 above the water-line. (Shown by the dotted line 23, Fig. 1.) The thermal plate 1 is of a length to adapt itself to encircle tires of various diameters by being severed. Upon each severed portion there is formed a projecting lug 24, through which passes a bolt 25 for compressing the tire after being inserted into the thermal plate. The intervening space 26 between the severed end portions 27 and 28 is closed by a plate 29 between the severed end portion 27 and is in movable contact with the end portion 28. In the construction of a thermal plate adapted to vulcanize a portion of the tire I have provided a clamping device 30, comprising a yoke portion 31, encircling the thermal plate 1. Integral therewith and in a central position is a boss 32, having a screw-threaded aperture through its vertical axis to engage coincident screw-threads formed upon the stem 32, having movably secured upon its inner end 3 a clamp portion 35. The tire in this instance not being inflated is compressed between the thermal plate 1 and the clamp 35, which may also be employed in connection with the thermal plate 1. (Illustrated in Fig. 1.) The steam-generator 5 is inclosed in a jacket 36, which prevents the radiation of heat.

37 designates a socket which may be secured to the thermal plate 1 and is pendent therefrom within the interior 38 of the steam-riser 6. The socket 37 is used for protecting the valve-stem, which is embedded in insulating material and inserted into the socket during the operation of vulcanizing a valve-stem to the tire.

It will be seen that the steam may rise on all sides of the socket into the thermal plate and therefore offer no obstruction to the passage of steam.

In the operation the abraded traction-surface of the tire is coated with a suitable preparation and inserted into the vulcanizer. The bolt 25 of the thermal plate 1 is adjusted and the tire inflated to bring the surface to be reinforced into intimate contact with the thermal plate. A caloric medium is now introduced in the base of the steam-generator 5, which being previously filled with water to the proper height the steam is generated by the combustion of the medium generating the thermal units, which are quickly absorbed by the elongated ellipsoid water-tubes and generate the steam which rises through the riser 6 into the thermal plate 1, heating the same to the proper temperature to vulcanize the prepared portion or portions of the tire. The condensation of the steam in the thermal plate returns through the same passage to the generator.

It will be seen from the aforegoing that my invention furnishes a simple and inexpensive apparatus for reinforcing the abraded portion or portions of the tire with a minimum amount of labor and expense.

A puncture in the tire may be repaired by preparing the punctured portion in the proper manner and securing the tire to the thermal plate by a clamp device. (Illustrated in Fig. 6.)

The thermal plate 1 may be made to completely encircle an inflated tire or may be made in short arcs to repair punctures in the tire, as may be desired.

What I claim is—

1. In an apparatus for vulcanizing tires, a base, a generator secured thereto, a tubular thermal plate, adapted to encircle an inflated tire, a riser between a thermal tube and the generator.

2. In an apparatus for vulcanizing tires, a semicircular tubular thermal plate, adapted to encircle an inflated tire, a steam-generator mounted upon a base comprising water-legs, having communication with each other through elongated ellipsoid tubes, slightly inclined, a riser connecting the steam-dome with the thermal tube, and means for adjusting the tube to various diameters.

3. In an apparatus for vulcanizing the reinforced material applied to the abraded traction-surface of a tire, a steam-generator supported upon a base, comprising a plurality of elongated ellipsoid water-tubes to establish a connection with the water-legs upon opposite sides, a steam-dome, a riser having located therein a cut-off valve, a union for easily detaching the riser from the steam-dome, a thermometer secured to the generator, a semicircular tubular thermal plate supported upon the riser, and bent in circular formation to embrace within itself a smaller diameter, a tire mounted upon a wheel, the thermal tube being severed, and having formed upon the opposite severed portion projecting lugs, whereby the severed portions may be closed or expanded by suitable means, and a plate secured to one end of the severed portion and in free contact with the opposite section adapted to inclose the intervening space between the expanded sections.

4. In an apparatus for vulcanizing tires, a steam-generator supported upon the base, means for introducing a caloric agent in the base, a tubular thermal plate supported upon a steam-riser of circular formation, a clamping device adapted to secure the tire to the thermal tube, a thermometer and a try-cock.

5. In an apparatus for vulcanizing tires, a steam-generator supported upon a base, a steam-riser, a tubular thermal plate supported thereon, being of circular formation, a socket portion secured to the thermal plate, and pendent therefrom within the steam-riser, whereby a valve-stem may be embedded within the socket for securing a valve-stem to the tire.

In testimony that I claim the foregoing as my own I hereby affix my signature in presence of two witnesses.

JAMES E. BANCROFT.

Witnesses:
WILLIAM WEBSTER,
MAUD SCHUMACHER.